(12) United States Patent
Wittmann (10) Patent No.: US 6,565,043 B1
(45) Date of Patent: May 20, 2003

(54) REDUNDANT SYSTEM FOR SATELLITE INCLINATION CONTROL WITH ELECTRIC THRUSTERS

(75) Inventor: Alois Wittmann, Rancho Palos Verdes, CA (US)

(73) Assignee: The Boeing Company, Seattle, WA (US)

( * ) Notice: Subject to any disclaimer, the term of this patent is extended or adjusted under 35 U.S.C. 154(b) by 33 days.

(21) Appl. No.: 10/035,752

(22) Filed: Dec. 21, 2001

(51) Int. Cl.⁷ .............................. B64G 1/26; B64G 1/40
(52) U.S. Cl. ...................................... 244/169
(58) Field of Search ........................ 244/52, 169, 172; 60/203.1

(56) References Cited

U.S. PATENT DOCUMENTS

| | | | |
|---|---|---|---|
| 4,955,559 A | * | 9/1990 | Kaminskas ................ 244/52 |
| 6,032,904 A | * | 3/2000 | Hosick et al. ............. 244/169 |
| 6,135,394 A | * | 10/2000 | Kamel et al. ............. 244/172 |
| 6,173,565 B1 | * | 1/2001 | Cassady et al. ........... 60/203.1 |

FOREIGN PATENT DOCUMENTS

| | | | | |
|---|---|---|---|---|
| JP | 2-200599 A | * | 8/1990 | ............ 244/169 |
| JP | 5-170193 A | * | 7/1993 | ............ 244/169 |

* cited by examiner

Primary Examiner—Robert P. Swiatek
(74) Attorney, Agent, or Firm—DiPinto & Shimokaji, P.C.

(57) ABSTRACT

A thruster system for spacecraft includes a thruster, a thruster mounting boom, a gimbals mechanism connecting the thruster to the thruster mounting boom, and a pivot mechanism connected to the thruster mounting boom, where the pivot mechanism attaches the thruster mounting boom to a spacecraft. A method includes steps of providing a first thruster mounted on a pivoting thruster mounting boom attached to a spacecraft; using the first thruster at a first position, for example, a north pointing position, to provide orbit control; repositioning the first thruster to a second position, for example, a south pointing position; and using the first thruster at the second position to provide orbit control so as to provide redundancy for a failed second thruster by repositioning the first thruster.

25 Claims, 5 Drawing Sheets

REDUNDANT SYSTEM FOR SATELLITE INCLINATION CONTROL WITH ELECTRIC THRUSTERS

BACKGROUND OF THE INVENTION

The present invention generally relates to orbit inclination and altitude control for spacecraft and, more particularly, to a satellite orbit inclination control system with redundancy to enhance reliability.

Figure 1:
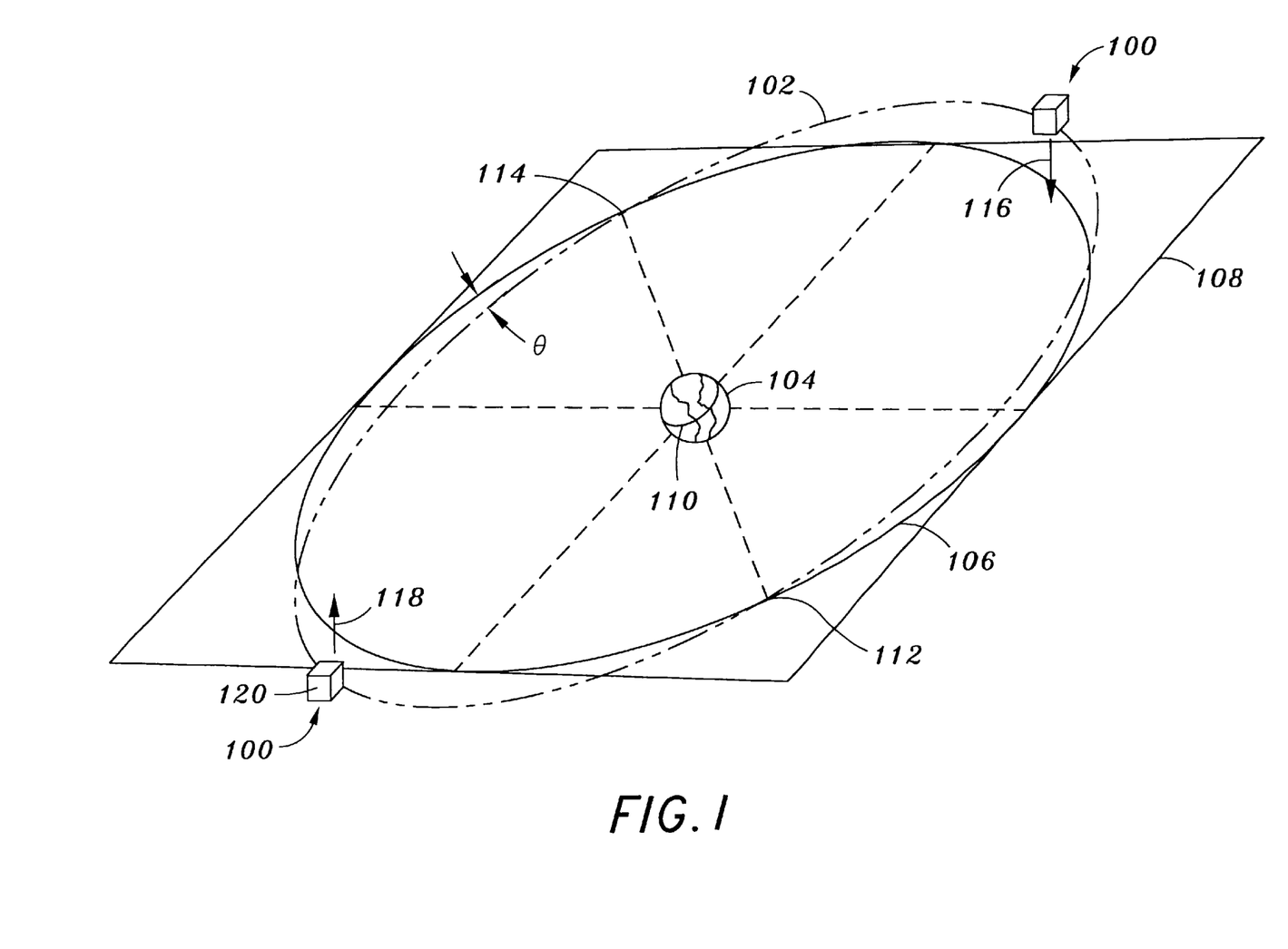
FIG. 1 is an illustrative depiction of a satellite in orbit around the earth.

It is common for satellites in orbit to use two north and two south pointing electric plasma thrusters for control of the inclination of the satellite's orbit, and for station keeping and altitude control. For example, FIG. 1 shows satellite 100, which may be a geosynchronous satellite, in two different positions in its flight orbit 102 about the earth 104. A geosynchronous orbit is of particular importance for many satellites, including communications and navigation satellites. FIG. 1 shows geosynchronous orbit 106 in the plane 108 of the equator 110 of the earth 104. Because equator 110 of the earth 104 lies in plane 108, plane 108 may also be referred to as the equatorial plane, or the equatorial orbit plane of geosynchronous orbit 106. As seen in FIG. 1, flight orbit 102 of satellite 100 lies in a plane which is inclined to equatorial orbit plane 108, as indicated in FIG. 1 by angle of inclination θ. In order to maintain satellite 100 in geosynchronous orbit, it is desired to provide inclination control by actuating north and south pointing thrusters at nodes 112 and 114, where the plane of flight orbit 102 and the equatorial orbit plane 108 of geosynchronous orbit 106 intersect. For example, by actuating a north pointing thruster at node 112, a correction in the direction indicated by arrow 116 may be provided, and by actuating a south pointing thruster at node 114, a correction in the direction indicated by arrow 118 may be provided, in order to correct the inclination of flight orbit 102 back to a geosynchronous orbit 106 in equatorial orbit plane 108. In other words, north and south pointing thrusters are actuated at nodes 112 and 114 to reduce angle of inclination θ to approximately 0.0 degrees.

The preferred mounting configuration for north and south pointing thrusters on satellite 100 is generally anti-nadir side 120 of satellite 100, i.e., the side of satellite 100 facing away from, or furthest from, the earth 104. Anti-nadir side 120 may be the preferred configuration for mounting thrusters due to various engineering constraints and for other technical reasons. For example, mounting thrusters on anti-nadir side 120 of satellite 100 may minimize interference of the thrusters with radio antennas and other communications devices requiring an unobstructed path to the earth 104, in the case where satellite 100 is a communications satellite. Because the force, or thrust, applied by north and south pointing thrusters to satellite 100 must be directed through the center of mass of satellite 100 to prevent torqueing satellite 100, there is a radial component to the thrust which acts to change the eccentricity of flight orbit 102. By actuating first one thruster at node 112 and then actuating an oppositely pointing thruster at node 114 on the opposite side of flight orbit 102, for example, first a north pointing and then a south pointing thruster, the radial component of the thrust may be effectively cancelled so as not to change the eccentricity of flight orbit 102, but only the angle of inclination θ of flight orbit 102. Thus, an operational system for inclination and altitude control of satellite 100 requires, at a minimum, a north and a south pointing thruster.

To ensure mission success, thrusters and their control electronics are currently provided with backup units. For example, where a minimum of two thrusters, i.e., a north pointing thruster and a south pointing thruster, is required, four thrusters may be installed to guarantee access to two thrusters in case of a single thruster failure. The approach of providing more thrusters, or in general more components of any type, than the minimum required in order to enhance reliability, guarantee access to the minimal number of components required in case of single component failure, and to ensure mission success is known as redundant design, or more briefly, redundancy.

Electric propulsion, more specifically plasma type electric propulsion, has been introduced for satellite control as a replacement for chemical propulsion primarily because of the improved specific impulse, i.e. the change in momentum produced using a unit mass of propellant, of plasma type electric propulsion over chemical propulsion. The specific impulse of electrical plasma thrusters is approximately an order of magnitude, or 10 times, greater than the specific impulse of chemical thrusters. Chemical propulsion thruster systems use many thrusters (typically 12) with optimal thrust orientations to reduce propellant use. A number of factors, such as component mass, mounting space and exhaust plume size, for example, do not allow for a simple one-for-one exchange of electrical plasma thrusters for chemical thrusters. In the example that follows, a chemical propulsion thruster system using 12 thrusters is compared to an electrical plasma thruster system using a reduced number of electrical plasma thrusters, i.e., 4 electrical plasma thrusters.

Figure 2:
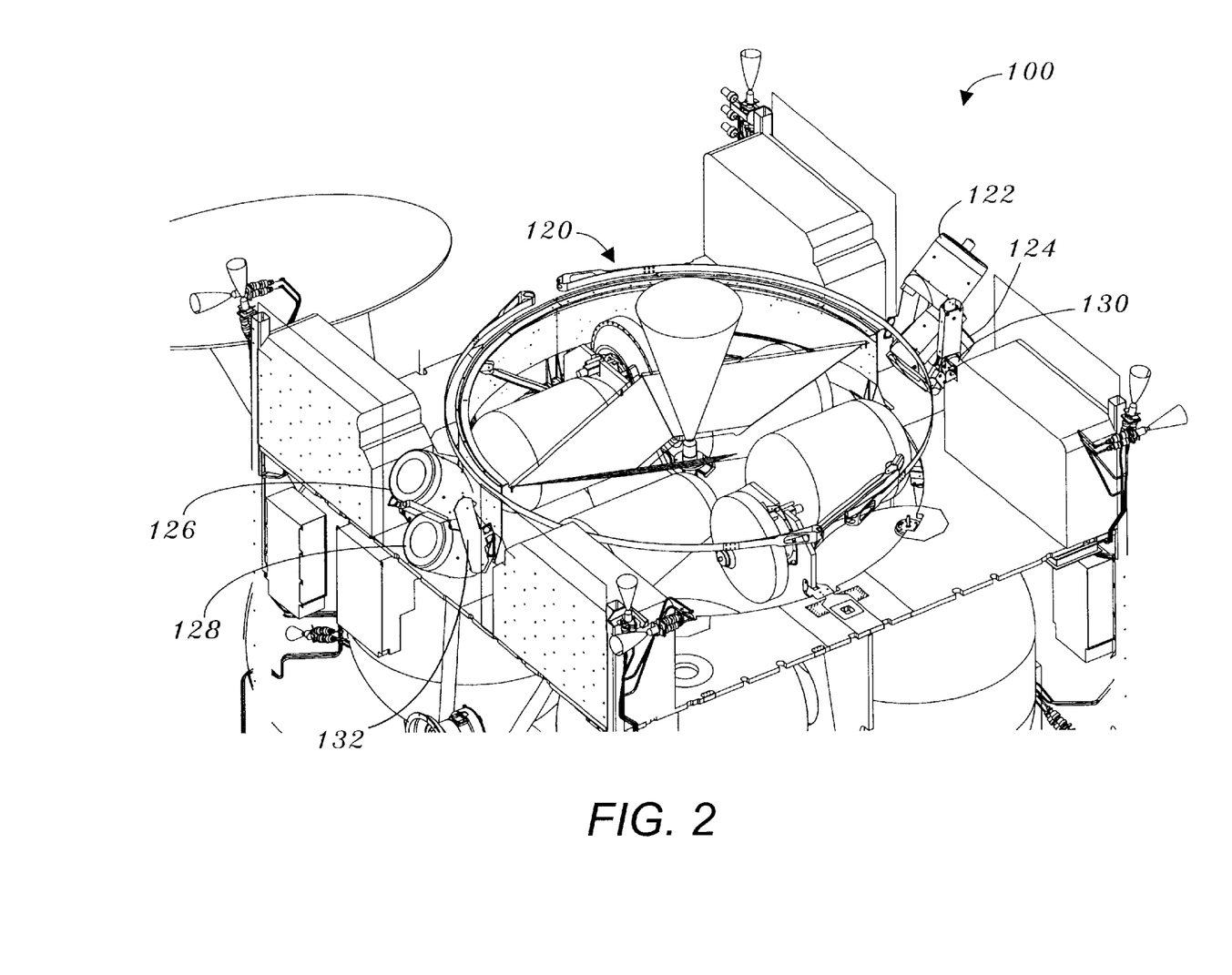
FIG. 2 is an isometric view of a portion of a satellite showing gimbals mounted electrical plasma thrusters.

FIG. 2 shows an example of an electrical plasma thruster system for satellite 100 using electrical plasma thrusters 122, 124, 126, and 128 as typically currently mounted at the anti-nadir side 120 of satellite 100. Two-axis gimbals mechanisms 130 and 132 are used to align the thrust vectors of electrical plasma thrusters 122, 124, 126, and 128 to the center of mass of satellite 100. This arrangement for an electrical plasma thruster system may reduce the overall weight of satellite 100, including weight of propellant required for some particular desired life span of satellite 100 and component weight of the thruster system, compared to a chemical propulsion thruster system. The cost of the electrical plasma thruster system, however, may be greater.

For example, in a typical satellite weighing approximately 3,000 kilograms (Kg) with a desired lifespan of approximately 15 years, approximately 1,000 Kg propellant may be needed for chemical thrusters compared to only 100 Kg of propellant for electrical plasma thrusters mounted in the same arrangement as the chemical thrusters. The propellant savings is primarily due to the order of magnitude advantage in specific impulse for the electrical plasma thrusters over chemical thrusters. The two-axis gimbals mounting arrangement using only 4 electrical plasma thrusters instead of 12 is less fuel efficient, however, requiring thruster actuations on opposite sides of the flight orbit as described above, so that 150 Kg of propellant may be needed for the 4 electrical plasma thrusters.

Additional mass inefficiency may be incurred when system redundancy is achieved by duplication of all components, rather than duplication of the functional requirements. Each electrical plasma thruster with its electronic controller and gimbals mechanism typically weighs 40 Kg compared to approximately 0.5 Kg for a chemical thruster. Thus, 12 chemical thrusters may be expected to weigh approximately 6 Kg, a negligible amount, compared to 480 Kg for 12 electrical plasma thrusters. By reducing the number of electrical plasma thrusters to four, the weight penalty for the electrical plasma thrusters is reduced to approximately 160 Kg. Thus, the total propellant and component weight for a chemical propulsion system may be expected to be approximately 1,000 Kg compared to a total weight of approximately 310 Kg for an electrical plasma thruster system using only 4 electrical plasma thrusters.

Typical cost for a chemical thruster system with 12 thrusters may be expected not to exceed approximately $1.5 million whereas typical cost for an electrical plasma thruster system with 4 thrusters may be expected not to exceed approximately $4.0 million. A simple one-for-one exchange of electrical plasma thrusters for chemical thrusters, then, becomes prohibitively expensive. In summary, a weight savings of approximately 700 Kg may be achieved, but at a cost penalty of approximately $2.5 million, by replacing a chemical propulsion thruster system with an electrical plasma thruster system having a reduced number of thrusters.

As can be seen, there is a need for an electrical plasma thruster system for inclination control, station keeping, and altitude control of satellite and spacecraft orbits, which reduces the weight and expense of the thruster system over the conventional two-axis gimbals mounting arrangements for electrical plasma thruster systems. There is also a need for an electrical plasma thruster system for inclination control, station keeping, and altitude control of satellite and spacecraft orbits which assures and improves reliability of the thruster system by providing the required redundancy.

SUMMARY OF THE INVENTION

The present invention provides an electrical plasma thruster system for inclination control, station keeping, and altitude control of satellite and spacecraft orbits, which reduces the weight and expense of the thruster system over the conventional mounting arrangements of four thrusters for electrical plasma thruster systems. The present invention also provides an electrical plasma thruster system for inclination control, station keeping, and altitude control of satellite and spacecraft orbits which assures and improves reliability of the thruster system by providing required redundancy, as well as by substituting more reliable components for less reliable ones.

In one aspect of the present invention, a system includes a thruster, a thruster mounting boom, a gimbals mechanism connecting the thruster to the thruster mounting boom, and a pivot mechanism connected to the thruster mounting boom, where the pivot mechanism attaches the thruster mounting boom to a spacecraft.

In another aspect of the present invention, a redundant system includes a first electrical plasma thruster and a second redundant electrical plasma thruster, a thruster mounting boom, a two-axis gimbals mechanism connecting the first thruster to the thruster mounting boom, a pivot mechanism connected to the thruster mounting boom, where the pivot mechanism attaches the thruster mounting boom to the spacecraft.

In still another aspect of the present invention, a redundant system includes a first electrical plasma thruster; a first thruster mounting boom; a first two-axis gimbals mechanism connecting the first thruster to the first thruster mounting boom, where the redundant system includes a first actuator and a first control unit for controlling the first two-axis gimbals mechanism to position and point the first electrical plasma thruster; and a first pivot mechanism connected to the first thruster, mounting boom, where the first pivot mechanism attaches the first thruster mounting boom to the anti-nadir side of the spacecraft, and the redundant system includes a second actuator and a second control unit for pivoting and positioning the first thruster mounting boom. The redundant system also includes a second electrical plasma thruster; a second thruster mounting boom; a second two-axis gimbals mechanism connecting the second electrical plasma thruster to the second thruster mounting boom where the redundant system includes a third actuator and a third control unit for controlling the second two-axis gimbals mechanism to position and point the second electrical plasma thruster; and a second pivot mechanism connected to the second thruster mounting boom, where the second pivot mechanism attaches the second thruster mounting boom to the anti-nadir side of the spacecraft, and the redundant system includes a fourth actuator and a fourth control unit for pivoting and positioning the second thruster mounting boom.

In a further aspect of the present invention, a method includes steps of providing a first thruster mounted on a pivoting thruster mounting boom attached to a spacecraft; using the first thruster at a first position, for example, a north pointing position, to provide orbit control; repositioning the first thruster to a second position, for example, a south pointing position; and using the first thruster at the second position to provide orbit control so as to provide redundancy for a failed second thruster by repositioning the first thruster.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention provides an electrical plasma thruster system for inclination control, station keeping, and altitude control of satellite and spacecraft orbits, which reduces the weight and expense of the thruster system over the conventional two-axis gimbals mounting arrangements for electrical plasma thruster systems. In one embodiment of the present invention, an electrical plasma thruster system reduces weight and expense compared to a conventional two-axis gimbals mounting arrangement for electrical plasma thrusters by reducing the number of thrusters from four to two, achieving a weight savings of approximately 30 Kg total for the two electrical plasma thrusters eliminated plus some extra weight savings associated with elimination of the two-axis gimbals mounting and electronic control units for each eliminated thruster. The weight savings may be partially offset by the weight of the thruster mounting boom and pivot mechanism used to achieve the elimination of two of the four thrusters. In addition, a reduction in mounting volume may be achieved along with a spacecraft mass reduction of approximately 40 Kg, and cost savings are gained by eliminating thrusters.

The present invention also provides an electrical plasma thruster system for inclination control, station keeping, and altitude control of satellite and spacecraft orbits which assures and improves reliability of the thruster system by providing required redundancy, as well as by substituting more reliable components for less reliable ones. In one embodiment, an electrical plasma thruster may be repositioned from a north pointing position to a south pointing position, and vice versa, by pivoting a thruster mounting boom on which is mounted the electrical plasma thruster. Thus, in effect, two north pointing thrusters mounted on gimbals are replaced by one north pointing thruster mounted on a thruster mounting boom, and similarly the two south pointing thrusters mounted on gimbals are replaced by one south pointing thruster mounted on another thruster mounting boom. By providing a pivoting boom mounting for each normally north or south pointing thruster, each thruster can take over for the other in case either one fails by pivoting the thruster mounting boom to reposition the functioning thruster to perform the satellite control function of the failed thruster. Thus, two thrusters on pivoting thruster mounting booms achieve the same redundancy as four conventionally gimbaled thrusters while reducing the overall weight and expense of the satellite or spacecraft.

In effect, the redundancy function of one of each pair of conventionally mounted thrusters may be viewed as having been replaced by a pivoting thruster mounting boom in an embodiment at a substantial savings in cost and weight over conventional thruster systems. Furthermore, the pivoting thruster mounting boom is a mechanical device which is much less complex and, thus, more reliable, than the electrical plasma thruster it replaces. Thus, in one embodiment, reliability is further augmented over conventionally gimbaled thrusters by achieving the same redundancy while using more reliable components. According to one embodiment, the invention may be viewed as providing redundancy by the repositioning of components as an alternative to providing more components, i.e., expensive and relatively heavy electrical plasma thrusters. By way of contrast, the prior art has focused almost exclusively on providing increased reliability and redundancy by simply providing more copies of components.

Figure 3:
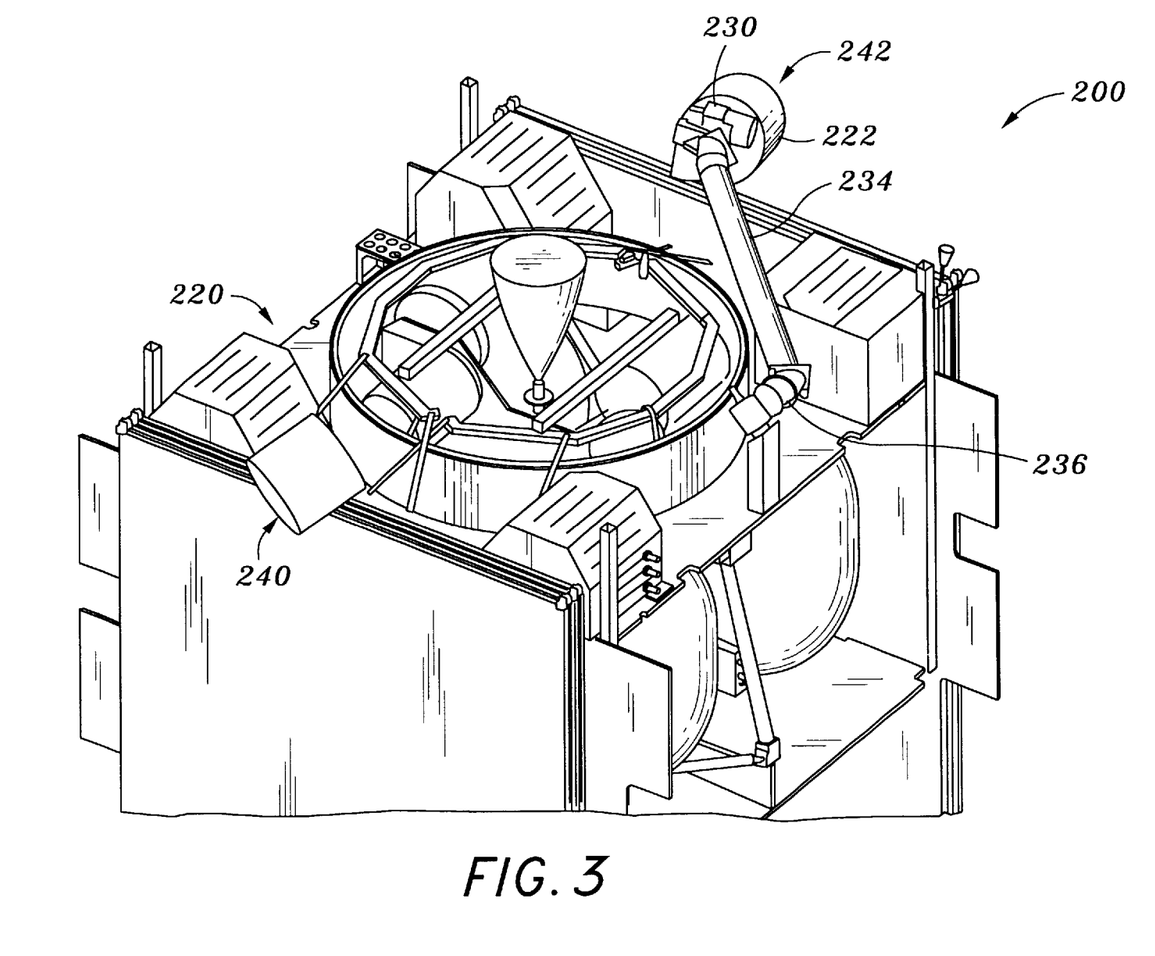
FIG. 3 is an isometric view of a portion of a satellite showing two positions of a boom mounted thruster according to one embodiment of the present invention.

Referring now to FIG. 3, an example of a single electrical plasma thruster mounted on a pivoting thruster mounting boom according to one embodiment is illustrated. FIG. 3 shows electrical plasma thruster 222 mounted at anti-nadir side 220 of satellite 200. Electrical plasma thruster 222 can be mounted on two-axis gimbals mechanism 230, which connects electrical plasma thruster 222 to thruster mounting boom 234. Thruster mounting boom 234 can be connected to pivot mechanism 236, which attaches thruster mounting boom 234 to anti-nadir side 220 of satellite 200. Pivot mechanism 236 may be a single axis rotating device or may include a gimbals mechanism, as known in the art, for providing additional degrees of freedom of movement for thruster mounting boom 234. Satellite 200 may also include a flexible propellant line and electric wiring (not shown) routed to pass around or through pivot mechanism 236 for providing propellant, electric power, and control signals from satellite 200 to electrical plasma thruster 222. As shown in FIG. 3, electrical plasma thruster 222 may be repositioned between a first position 240, which may be, for example, a south pointing position, and a second position 242, which may be, for example, a north pointing position.

Satellite 200, pivot mechanism 236, thruster mounting boom 234, and two-axis gimbals mechanism 230 may either include or be connected to actuators and control units for pointing and positioning electrical plasma thruster 222, for example, drive motors and associated control systems may be used, as known in the art. Actuators and control units may be used for the gimbals mechanisms, referred to as gimbals actuators and gimbals control units, or may be used for the pivoting mechanisms, referred to as pivoting actuators and pivoting control units. Redundancy may be achieved, for example, by providing a second electrical plasma thruster mounted on a second pivoting thruster mounting boom attached to anti-nadir side 220 of satellite 200. Redundancy may also be achieved by providing, for example, a single redundant thruster mounted on a single pivoting thruster mounting boom for backing up a pair of conventionally mounted north and south pointing thrusters mounted on two-axis gimbals mechanisms. Another example of a possible arrangement for providing redundancy would be to use one conventionally mounted thruster, for example, a south pointing thruster, back up by a normally north pointing thruster mounted on a pivoting thruster mounting boom. As can be seen, the use of a pivoting thruster mounting boom provides a great amount of flexibility for providing redundancy using different arrangements.

Figure 4:
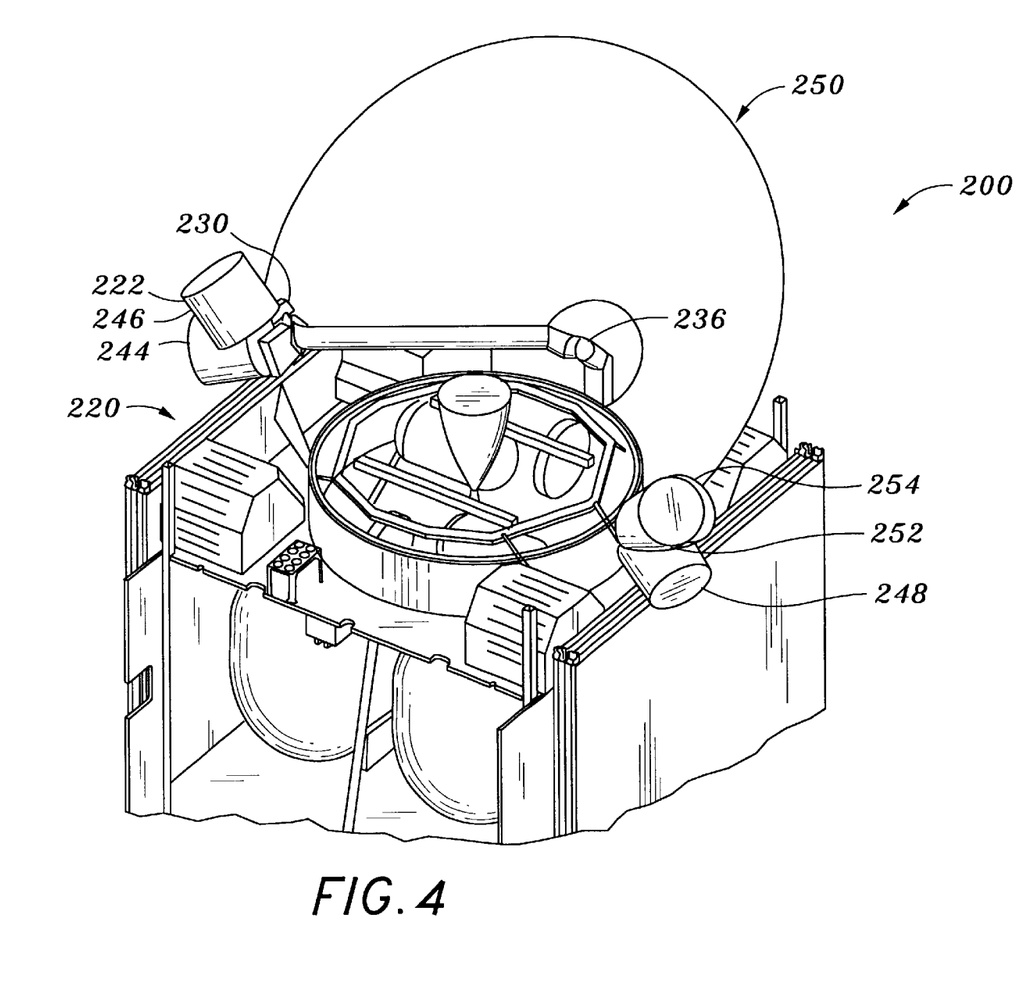
FIG. 4 is an isometric view of a portion of a satellite showing two positions of a boom mounted thruster and the path swept by the boom between the two positions in accordance with one embodiment of the present invention.

Referring now to FIG. 4, an example is illustrated, according to one embodiment, of a single electrical plasma thruster mounted on a pivoting thruster mounting boom, showing the path swept by the thruster mounting boom between two positions of a boom mounted thruster. FIG. 4 shows electrical plasma thruster 222 mounted on anti-nadir side 220 of satellite 200. Electrical plasma thruster 222 can be mounted on two-axis gimbals mechanism 230, which permits motion of electrical plasma thruster 222 between, for example, a first position 244 and a second position 246 for properly directing the thrust from electrical plasma thruster 222 through the center of mass of satellite 200.

Thruster mounting boom 234 may be connected to pivot mechanism 236, so that thruster mounting boom 234 may be repositioned to effect repositioning of electrical plasma thruster 222 from position 246, which may be, for example, a north pointing thruster position, to initial position 248. The clearance needed to pivot thruster mounting boom 234 is illustrated in FIG. 4 by thruster mounting boom swept path 250. Once electrical plasma thruster 222 is repositioned to initial position 248, by pivoting thruster mounting boom 234, electrical plasma thruster 222 may be repositioned to intermediate position 252 using two-axis gimbals mechanism 230. Two-axis gimbals mechanism 230 may then be used to direct electrical plasma thruster 222 to final position 254, which may be, for example, a south pointing thruster position with the thrust from electrical plasma thruster 222 directed approximately through the center of mass of satellite 200. As noted above, redundancy may be achieved by providing a second electrical plasma thruster mounted on a second pivoting thruster mounting boom attached to anti-nadir side 220 of satellite 200, or by a number of other different arrangements.

Figure 5:
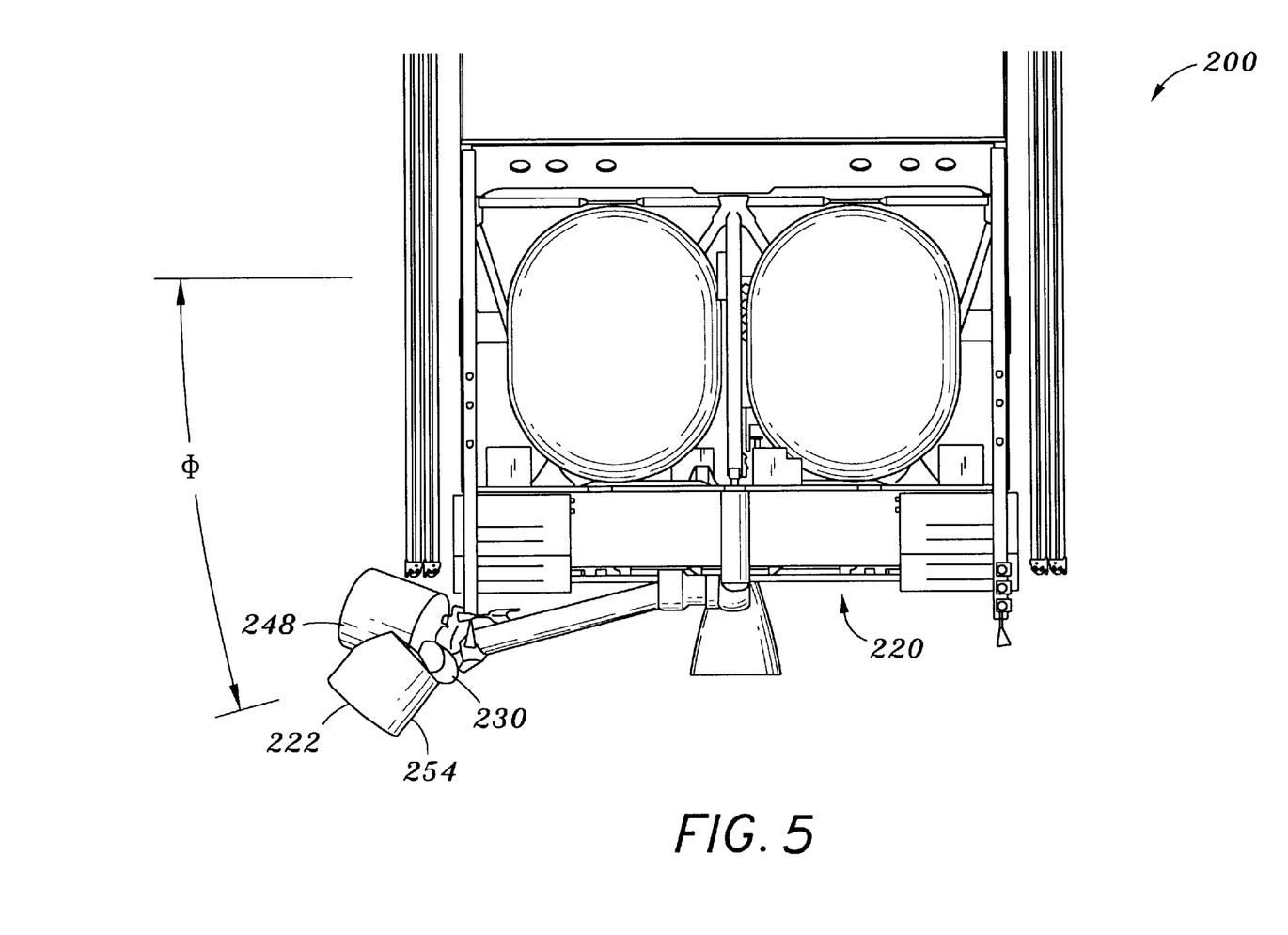
FIG. 5 is an east-west facing view of a portion of a satellite, with the anti-nadir side of the satellite oriented toward the bottom of the view and north-south surfaces of the satellite oriented toward the sides of the view, showing two positions of a thruster mounted on a boom, according to one embodiment of the present invention.

Referring now to FIG. 5, an example is illustrated, according to one embodiment, of an electrical plasma thruster mounted on a pivoting thruster mounting boom, showing two positions of a boom mounted thruster. FIG. 5 shows electrical plasma thruster 222 mounted at anti-nadir side 220 of satellite 200. Electrical plasma thruster 222 may be mounted on two-axis gimbals mechanism 230, which provides motion of electrical plasma thruster 222 between, for example, initial position 248 and final position 254. Final position 254 may be, for example, a south pointing thruster position with the thrust from electrical plasma thruster 222 directed approximately through the center of mass of satellite 200. Satellite 200 may include sensing, drive, and control mechanisms, as known in the art, for correctly aiming electrical plasma thruster 222 so that thrust from electrical plasma thruster 222 is directed approximately through the center of mass of satellite 200 as indicated by angle φ in FIG. 5.

It should be understood, of course, that the foregoing relates to preferred embodiments of the invention and that modifications may be made without departing from the spirit and scope of the invention as set forth in the following claims.

I claim:

1. A system comprising:
   a thruster;
   a thruster mounting boom;
   a gimbals mechanism connecting said thruster to said thruster mounting boom; and
   a pivot mechanism connected to said thruster mounting boom, said pivot mechanism adapted for attaching said thruster mounting boom to a spacecraft.

2. The system of claim 1, further comprising:
   a second thruster for providing redundancy;
   a second thruster mounting boom;
   a second gimbals mechanism connecting said second thruster to said second thruster mounting boom; and
   a second pivot mechanism connected to said second thruster mounting boom, said second pivot mechanism adapted for attaching said second thruster mounting boom to said spacecraft.

3. The system of claim 1, further comprising an actuator and a control unit for pivoting and positioning said thruster mounting boom.

4. The system of claim 1, further comprising an actuator and a control unit for controlling said gimbals mechanism to position and point said thruster.

5. The system of claim 1, further comprising a flexible propellant line for delivering propellant from said spacecraft to said thruster.

6. The system of claim 1, further comprising flexible electric wiring for delivering electric power from said spacecraft to said thruster.

7. The system of claim 1, further comprising flexible electric wiring for delivering control signals from said spacecraft.

8. The system of claim 1 wherein said thruster is an electrical plasma thruster.

9. The system of claim 1 wherein said thruster is mounted on an anti-nadir side of said spacecraft.

10. The system of claim 1 wherein said gimbals mechanism is a two-axis gimbals mechanism.

11. A redundant system comprising:
    a first electrical plasma thruster;
    a thruster mounting boom;
    a two-axis gimbals mechanism connecting said first thruster to said thruster mounting boom;
    a pivot mechanism connected to said thruster mounting boom, said pivot mechanism adapted for attaching said thruster mounting boom to a spacecraft; and
    a second electrical plasma thruster.

12. The system of claim 11, further comprising:
    a second two-axis gimbals mechanism connecting said second electrical plasma thruster to said spacecraft.

13. The system of claim 12, further comprising:
    a third electrical plasma thruster;
    a third two-axis gimbals mechanism connecting said third electrical plasma thruster to said spacecraft, wherein said second thruster is a north pointing thruster, said third thruster is a south pointing thruster, and said first thruster provides redundancy by pivoting said thruster mounting boom to reposition said first thruster to a north pointing position in case of failure of said second thruster and to a south pointing position in case of failure of said third thruster.

14. The system of claim 11, further comprising:
    a second thruster mounting boom;
    a second two-axis gimbals mechanism connecting said second electrical plasma thruster to said second thruster mounting boom; and
    a second pivot mechanism connected to said second thruster mounting boom, said second pivot mechanism adapted for attaching said second thruster mounting boom to said spacecraft.

15. The system of claim 11, further comprising an actuator and a control unit for pivoting and positioning said thruster mounting boom.

16. The system of claim 11, further comprising an actuator and a control unit for controlling said two-axis gimbals mechanism to position and point said first electrical plasma thruster.

17. The system of claim 11, further comprising a flexible propellant line for delivering propellant from said spacecraft to said first electrical plasma thruster and said second electrical plasma thruster.

18. The system of claim 11 wherein said first electrical plasma thruster and said second electrical plasma thruster are mounted on an anti-nadir side of said spacecraft.

19. A redundant system comprising:
    an electrical plasma thruster;
    a thruster mounting boom;
    a two-axis gimbals mechanism connecting said thruster to said thruster mounting boom, wherein said redundant system includes a gimbals actuator and a gimbals control unit for controlling said two-axis gimbals mechanism to position and point said first electrical plasma thruster;
    a pivot mechanism connected to said thruster mounting boom, said pivot mechanism adapted for attaching said thruster mounting boom to an anti-nadir side of a spacecraft, wherein said redundant system includes a pivot actuator and a pivot control unit for pivoting and positioning said thruster mounting boom; and
    a second electrical plasma thruster.

20. The redundant system of claim 19, further comprising:
    a second two-axis gimbals mechanism connecting said second electrical plasma thruster to said spacecraft;
    a second gimbals actuator; and
    a second gimbals control unit for controlling said second two-axis gimbals mechanism to position and point said second electrical plasma thruster.

21. The redundant system of claim 19, further comprising:

a second thruster mounting boom;

a second two-axis gimbals mechanism connecting said second electrical plasma thruster to said second thruster mounting boom wherein said redundant system includes a second gimbals actuator and a second gimbals control unit for controlling said second two-axis gimbals mechanism to position and point said second electrical plasma thruster; and a second pivot mechanism connected to said second thruster mounting boom, said second pivot mechanism adapted for attaching said second thruster mounting boom to said anti-nadir side of said spacecraft, wherein said redundant system includes a second pivot actuator and a second pivot control unit for pivoting and positioning said second thruster mounting boom.

22. A method comprising steps of:

providing a first thruster mounted on a pivoting thruster mounting boom attached to a spacecraft;

using said first thruster at a first position to provide orbit control;

repositioning said first thruster to a second position; and using said first thruster at said second position to provide orbit control so as to provide redundancy for a second thruster, in case of failure of said second thruster, by repositioning said first thruster.

23. The method of claim 22 wherein said first position is a north pointing position and said second position is a south pointing position.

24. The method of claim 22 wherein said second thruster is mounted on a two-axis gimbals mechanism connecting said second thruster to said spacecraft.

25. The method of claim 22 further comprising steps of:

providing said second thruster mounted on a pivoting second thruster mounting boom attached to said spacecraft;

using said second thruster at said first position to provide orbit control;

repositioning said second thruster to said second position; and using said second thruster at said second position to provide orbit control so as to provide redundancy for said first thruster, in case of failure of said first thruster, by repositioning said second thruster.

* * * * *